(12) United States Patent
Misawa

(10) Patent No.: US 7,607,809 B2
(45) Date of Patent: Oct. 27, 2009

(54) ILLUMINATED VEHICLE EXTERIOR HANDLE CONFIGURATION

(75) Inventor: Akihiro Misawa, Nishikasugai-gun (JP)

(73) Assignee: Toyoda Gosei Co., Ltd., Aichi-pref (JP)

( * ) Notice: Subject to any disclaimer, the term of this patent is extended or adjusted under 35 U.S.C. 154(b) by 75 days.

(21) Appl. No.: 11/261,641

(22) Filed: Oct. 31, 2005

(65) Prior Publication Data
US 2006/0104075 A1 May 18, 2006

(30) Foreign Application Priority Data
Nov. 12, 2004 (JP) ............................. 2004-329138

(51) Int. Cl.
*B60Q 1/26* (2006.01)
(52) U.S. Cl. ...................... 362/501; 362/487; 362/504; 362/509
(58) Field of Classification Search ................. 362/501, 362/611, 612, 296, 487, 800, 504, 509, 510
See application file for complete search history.

(56) References Cited

U.S. PATENT DOCUMENTS

| | | | | | |
|---|---|---|---|---|---|
| 1,416,467 | A | * | 5/1922 | Hobbs | 362/487 |
| 3,184,331 | A | * | 5/1965 | Carter | 427/398.3 |
| 3,280,321 | A | * | 10/1966 | Overesch | 362/100 |
| 4,041,301 | A | * | 8/1977 | Pelchat | 362/100 |
| 5,029,917 | A | * | 7/1991 | Szerlag et al. | 292/347 |
| 6,000,822 | A | * | 12/1999 | Polizzi et al. | 362/488 |
| 6,070,998 | A | * | 6/2000 | Jennings et al. | 362/501 |
| 6,254,261 | B1 | * | 7/2001 | Bingle et al. | 362/501 |
| 6,550,946 | B2 | * | 4/2003 | Misawa et al. | 362/501 |
| 2001/0006465 | A1 | * | 7/2001 | Misawa et al. | 362/501 |
| 2003/0063037 | A1 | * | 4/2003 | March et al. | 343/711 |
| 2003/0095416 | A1 | * | 5/2003 | Huizenga | 362/501 |
| 2005/0073804 | A1 | * | 4/2005 | Maruyama et al. | 361/600 |

FOREIGN PATENT DOCUMENTS

| | | |
|---|---|---|
| JP | A-3-125768 | 5/1991 |
| JP | A-2003-113680 | 4/2003 |
| JP | A-2003-113681 | 4/2003 |
| JP | A-2004-244990 | 9/2004 |

* cited by examiner

*Primary Examiner*—Ismael Negron
(74) *Attorney, Agent, or Firm*—Posz Law Group, PLC

(57) ABSTRACT

The exterior handle configuration of the present invention includes a panel having a recess portion and a handle that covers the upper periphery of the recess portion. An inside surface of the handle is finished with a mirror treatment that reflects and diffuses light. At least one light source fixed at the panel emits light that is directed between the recess portion and the handle. A reflecting surface reflects light emitted from the light source to the inside surface of the handle. The handle configuration of the present invention improves the visibility of the exterior handle during nighttime in a visually pleasing manner.

22 Claims, 3 Drawing Sheets

ILLUMINATED VEHICLE EXTERIOR HANDLE CONFIGURATION

CROSS REFERENCE TO RELATED APPLICATION

This application is based on and incorporates by reference Japanese Patent Application No. 2004-329138, which was filed on Nov. 12, 2004.

BACKGROUND OF THE INVENTION

The present invention relates generally to handles, and more specifically to an exterior vehicle handle that includes an illumination device for improving nighttime visibility of the handle in a visually pleasing manner.

Two types of illuminated exterior vehicle handle configurations are well known. In a first type, a light source is included in the handle itself to illuminate the front of the handle, while in a second type only a backside of the handle is illuminated. In the second type, the light source may be embedded in the handle or in a door panel of the vehicle.

The above-mentioned configurations in which the light source is located in the handle limit the number and location of the light sources due to the limited space in the handle for positioning the light sources. Moreover, because the handle is a moving part and has an external force applied thereto, the combination of the handle and the light source must be structured to ensure dependable operation over a long period of time. Specifically with regard to the above mentioned first type of handle, such a configuration is typically considered not as visually pleasing as the second type because the light source is directly observable.

In the above mentioned second type of handle configuration in which only the backside of the handle is illuminated, the handle must be structured to include a cover to prevent the light source from directly emitting light from the front of the handle. As a result, the structure becomes more complicated and less visually pleasing because such a cover spoils the appearance of the handle. Also regarding the second type of handle configuration, when the light source is in or on the door panel of the vehicle, the illumination from the light source is required to have a well-equalized luminous intensity. The door panel must therefore be finished with a surface diffusion treatment for diffusing light from the light source. While the diffusion treatment may diffuse a portion of the light, an uneven distribution in the luminous intensity is evident on the surface of the door panel because the light source is typically a light emitting diode (LED) and therefore is a point source.

SUMMARY OF THE INVENTION

To overcome the above-mentioned limitations of the prior art, an exterior vehicle handle configuration according to the present invention has been designed to include an illumination device that is uncomplicated in structure and that improves the visibility of the exterior handle during nighttime conditions in a visually pleasing manner.

The exterior vehicle handle configuration of the present invention includes a panel with a recess portion and a handle that covers the upper periphery of the recess portion. An inside surface of the handle is finished with a mirror treatment that reflects and diffuses light. At least one light source fixed at the panel emits light that is directed between the recess portion and the handle. A reflecting surface located on the recess portion reflects the light from the light source to the inside surface of the handle.

BRIEF DESCRIPTION OF THE DRAWINGS

The accompanying figures, in which like reference numerals refer to identical or functionally similar elements throughout the separate views and which, together with the detailed description below, are incorporated in and form part of the specification, serve to further illustrate various embodiments and to explain various principles and advantages all in accordance with the present invention.

DETAILED DESCRIPTION OF THE PREFERRED EMBODIMENTS

First Embodiment

Figure 1:
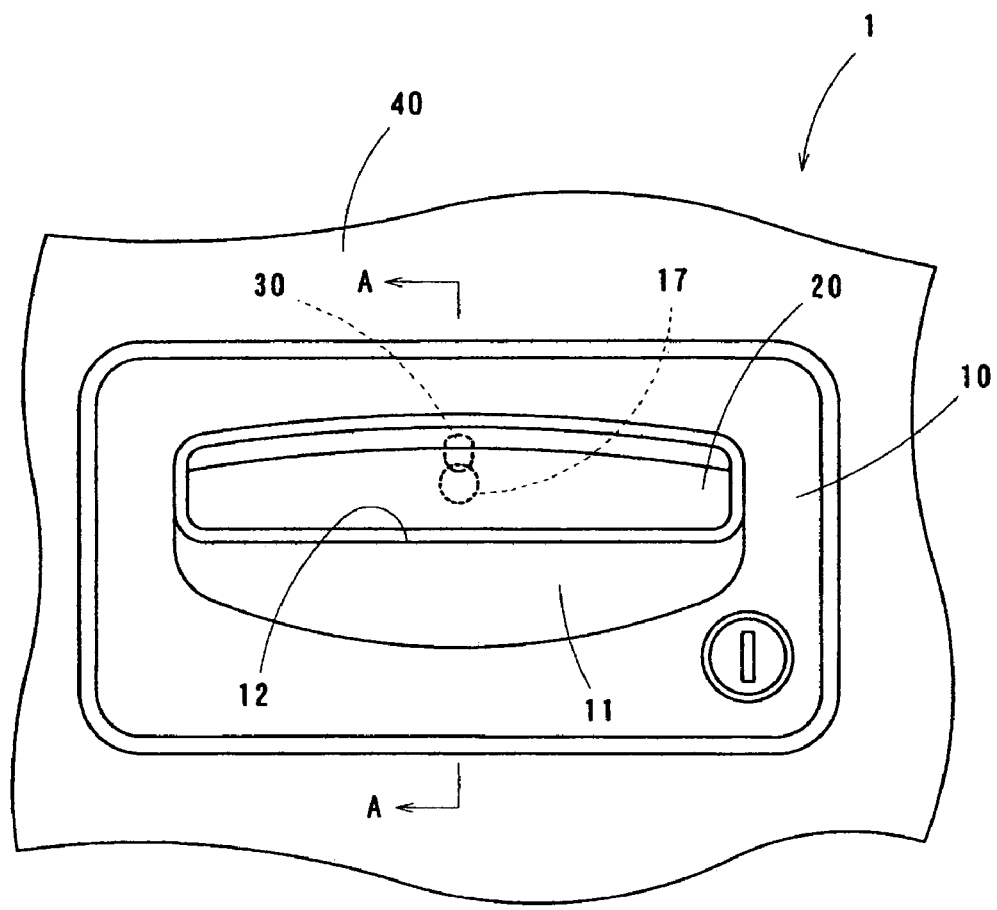
FIG. 1 shows a front view of an exterior vehicle handle configuration of the present invention.

Referring to FIG. 1, a vehicle exterior handle configuration (handle configuration) 1 according to the present invention will now be described. The handle configuration 1 includes a panel 10, a handle 20 and a light source, such as an LED 30. The panel 10 includes a concave recess portion 11. The surface of the recess portion 11 gradually deepens from its periphery to its center. The recess portion 11 includes a reflecting step 12 that faces upwardly and that horizontally divides the recess portion 11 into an upper portion and a lower portion. The reflecting step 12 is tapered so that it decreases in thickness as it tapers away to the lower portion of the recess portion 11. A mirror finish treatment is coated on the surface of the reflecting step 12 and the upper portion of the recess portion 11. The mirror finish treatment is formed by applying mirror paint, polishing the surface of the reflecting step 12 or other well known finishing steps. The mirror finish treatment preferably includes a diffusion agent that diffuses light. As a result, these surfaces have a high degree of reflectivity. On the other hand, the lower portion of the recess portion 11 is finished with a diffusion treatment by matt painting, blast finishing or other well known finishing steps. As a result, the lower portion of the recess portion 11 highly diffuses light. In the present embodiment, the panel 10 is a separate part from a vehicle door panel 40, but the recess portion 11 can be formed on the vehicle door panel 40.

A panel protrusion 13 is formed at the upper end of the recess portion 11 of the panel 10. The protrusion 13, in combination with a handle protrusion 25 that is formed on a recess side of the handle 20, serves as a light shield that prevents light of the LED 30 from being emitted between the recess portion 11 and the handle 20 to therefore visually enhance illumination of the handle 20. Alternatively, a light shield board, which may be fixed to a part of the handle 20 and/or the panel 10, can be used as the light shield to prevent light from being emitted so long as the light shield board does not interfere with the operation of the handle 20.

Figure 2A:
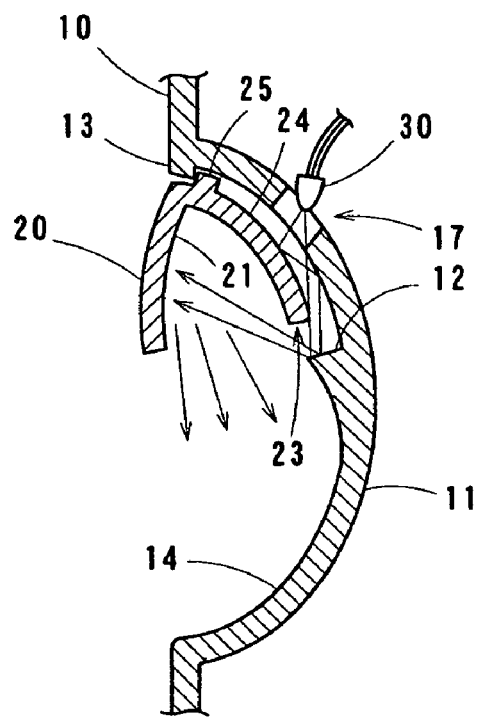
FIG. 2A shows a cross sectional view at line A-A line of FIG. 1 in which a handle of a handle configuration according to a first embodiment is in a closed position.

As shown in a first embodiment in FIG. 2A, a through hole 17 is formed behind the handle 20, and is centrally located in, and approximately one-third of the total recess portion vertical length from the top of, the recess portion 11. The shape of the through hole 17 is circular in the present embodiment, but can be of any shape that is sufficient to facilitate emission of light from the LED 30. For example, the through hole 17 can have a rectangular shape, an elliptical shape, a horizontally linear shape or the like. In addition, the through hole 17 can be filled with a transparent resin to protect the LED from ambient conditions and, if the transparent resin is colored, the color of the emitted light can be changed.

The LED 30 is used as a light source and is fixed behind the through hole 17. The light source is not limited to the LED 30, as any type of bulb can also be used as the light source. The LED 30 is a lamp type LED and emits a white light. As shown in FIG. 2A, a light axis is fixed to irradiate light toward just above the lower end of the recess portion 11. A plurality of like or different colored LEDs 30 can be alternatively be used as the light source. Also, different types of LED can be used, such as a surface mounted type LED. The LED 30 is connected to a power source to emit light when a door lock is unlocked by a remote control key. The LED 30 is controlled to be turned off when a door is closed.

Figure 2B:
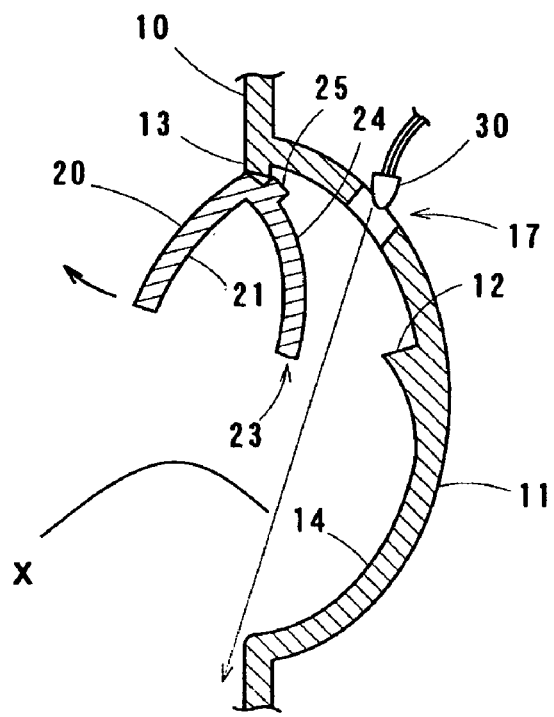
FIG. 2B shows a cross sectional view at line A-A of FIG. 1 in which a handle of a handle configuration according to the first embodiment is rotated outwardly to an open position.

As shown in FIGS. 2A and 2B, the handle 20, which covers the upper periphery of the recess portion 11, is hinged to the panel 10 at an outer surface thereof. The handle 20 can be rotated outwardly at an upper end portion thereof. The cross section of the handle 20 is a wedge shape, like a U-shape or V-shape. The handle 20 includes a handle protrusion 25 at the upper end thereof on the recess portion side. As mentioned above, the handle protrusion 25, together with the panel protrusion 13, functions as a light shield. The handle 20 includes an inside surface 21 and a backside surface 24, both of which are finished with the mirror treatment for purposes of light reflection. The mirror treatment is finished with metal plating and by painting using a transparent resin that includes a diffusion agent. On the other hand, the surface of the recess portion 14 is finished with the diffusion agent.

The illumination of the outside handle 1 will be explained referring to FIG. 2A. When a remote control key unlocks the door lock, the LED 30 is turned on and emits white light. The light from the LED 30 passes through the through hole 17 of the recess portion 11. Some of the light is incident on the reflecting step 12 of the recess portion 11. As mentioned above, the reflecting step 12 has a high degree of reflectivity and reflects the illuminated light toward the inside surface 21 of the handle 20. Light that passes through the through hole 17 is incident on and reflected from the backside surface 24 of the handle 20. The reflected light at the backside of the handle 20 is additionally reflected at the surface of the recess portion 11 and/or the reflecting step 12, and is then directed toward the inside surface 21 of the handle 20.

Still referring to FIG. 2A, the above-mentioned reflected light illuminates the inside surface 21 of the handle 20 and is additionally reflected corresponding to each angle of incidence. Specifically, light that is directed downwardly illuminates a lower area 14 of the recess portion 11, while light that is reflected again from the inside surface 21 of the handle 20 illuminates the lower area 14 of the recess portion 11.

Because the inside surface 21 includes a mirror finish treatment with a diffusion agent, the light from the LED 30 is reflected and diffused at the inside surface 21. As a result, the brightness of the light that illuminates the lower area 14 of the recess portion 11 is equalized. Moreover, because the lower surface 14 is finished with the diffusion agent, the light that illuminates the lower surface 14 is also diffused at the lower surface 14. Thus, the illumination around the exterior handle 20 is highly equalized. Furthermore, the illumination of the handle 20 is visually pleasing because the illumination is indirect.

Almost all of the light from the LED 30 is emitted downwardly and used for illuminating the exterior handle 20. However, some of the light from the LED 30 could also be emitted from the upper portion or the side portion of the recess portion 11. The panel protrusion 13 and the handle protrusion 25, however, prevent the emission of such light, thereby improving the overall visual effect of the illumination.

Referring to FIG. 2B, when the handle 20 is rotated outwardly, the handle 20 is deflected from the axis of the LED 30. As a result, some light emitted around the axis of the LED 30 is downwardly reflected and illuminates the ground as represented by arrow X. Thus, when the handle 20 is operated to open the door, the LED 30 illuminates the ground near the vehicle door. After a predetermined time has passed, the LED 30 is turned off. Then, a brightness of the LED 30 can gradually be controlled to reduce the brightness. The LED 30 can also be controlled to be turned off in response to the manipulation of the handle 20.

In the exterior handle configuration 1 of the present embodiment, the brightness of the illumination from the LED 30 is well equalized because the light emitted from the LED 30, which is reflected at the reflecting step 12, is reflected and diffused at the inside surface 21 of the handle 20 and is diffused at the lower portion 14 of the recess portion 11. The exterior handle 20 is illuminated by indirect light and therefore is visually pleasing. Also, because the panel protrusion 13 and the handle protrusion 25 prevent light from the LED 30 from being emitted from around the top and sides of the exterior handle configuration 1, light used to illuminate the exterior handle configuration 1 is only observed at the lower area 14 of the recess portion 11. Therefore, the illumination is visually pleasing. Moreover, when the handle 20 is rotated outwardly, the LED 30 is not observed by a passenger directly, because the LED 30 is placed behind the through hole 17. Thus, even though the handle configuration 1 of the present embodiment has a simple structure, the LED 30 is not directly observed.

Second Embodiment

Figure 3A:
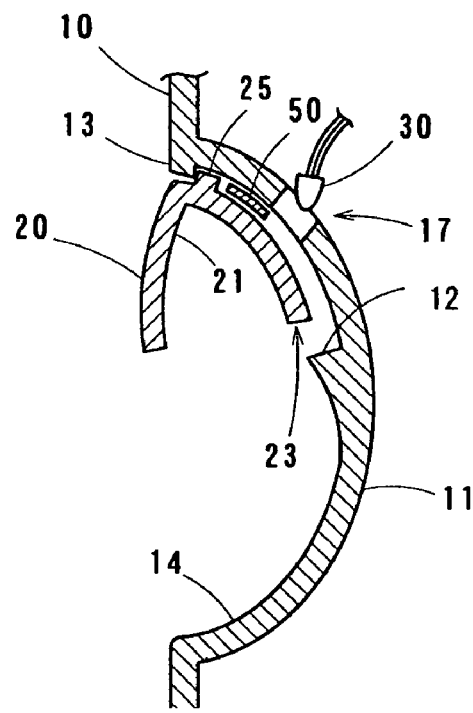
FIG. 3A shows a cross sectional view at line A-A of FIG. 1 in which a handle of a handle configuration according to a second embodiment is in a closed position.
Figure 3B:
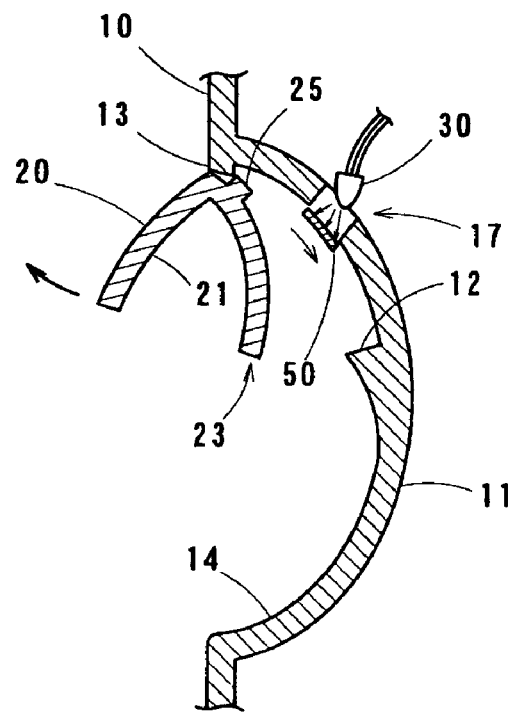
FIG. 3B shows a cross sectional view at line A-A of FIG. 1 in which a handle of a handle configuration according to the second embodiment is rotated outwardly to an open position.

Referring to a second embodiment in FIGS. 3A-3B, a light shield plate 50 is used for blocking the through hole 17 when the handle 20 is rotated outwardly. The light source shield plate 50, which is made of an opaque material, is slid by a slide mechanism (not shown) in response to the motion of the handle 20. In FIG. 3A, when the handle 20 is located at a fixed, or closed, position, the light source shield plate 50 is located at an upper position of the through hole 17. As shown in FIG. 3B, when the handle 20 is rotated outwardly to open the vehicle door, the light source shield plate 50 is slid to the lower position from the upper position and covers the through hole 17. Therefore, the light from the LED 30 is not emitted through the through hole 17. The light source shield plate 50 is slid back to the upper position when the handle 50 is released and rotates back to the fixed position.

In the second embodiment, when the handle 20 is located in the fixed position, the illumination of the exterior handle configuration 1 is the same as the first embodiment. On the other hand, when the handle 20 is rotated outwardly, the light source shield plate 50 blocks the light from the LED 30. Thus, in the second embodiment, the LED 30 continues to emit light around the exterior handle 1 before the handle 20 rotated, but does not illuminate the ground below the door after the handle 20 rotated outwardly. The slide mechanism of the light source shield plate 50 can be adapted to be moved by well-known mechanisms (electric motor-driven type or mechanical type). The shape and the material of the light source shield plate 50 are not limited to that described above as long as the material is capable of blocking the light from the LED 30.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiments were chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. A combination of a door handle and a vehicle door panel, the door handle including an outer surface being rotatably fixed to the vehicle door panel;
    the vehicle door panel including a recessed portion and a panel protrusion;
    the door handle having a wedge-shape and further including:
        an elongated portion having a concave shape following that of the recessed portion of the door panel within the recessed portion of the door panel,
        a handle protrusion cooperating with and rotating relative to the panel protrusion of the vehicle door panel for preventing light from being emitted from an area between an upper portion of the door panel and a backside surface of the door handle, and
        a concave inside surface,
    wherein both the backside surface and the inside surface of the door handle are finished with a mirror treatment for reflecting light when the door handle is in a non-rotated position.

2. A combination according to claim 1, wherein the recessed portion of the panel includes a reflective step; and when the handle is in a closed position, the door handle is configured to direct the light toward the reflection step, the reflection step is configured to direct the light toward the inside surface of the handle, and the inside surface of the handle is configured to direct the light toward a lower portion of the recessed portion of the door panel.

3. A combination according to claim 1, wherein the handle protrusion extends lengthwise along substantially an entire length of the backside surface of the door handle.

4. A combination according to claim 1, wherein the inside surface of the door handle is finished with a diffusion agent for diffusing light.

5. A combination according to claim 4, wherein the handle protrusion protrudes into a portion of the door panel where the door handle is fixed to the vehicle door panel.

6. An exterior vehicle handle configuration, comprising:
    a panel including a recessed portion, the recessed portion including an upwardly facing reflection step having a reflecting surface and a panel protrusion formed at an uppermost end of the recessed portion;
    a handle covering an upper periphery of the recessed portion of the panel, having a hollowed wedge-shape, and including
        a recessed elongated portion that extends along and within the recessed portion of the panel,
        a backside surface of the elongated portion of the handle being rotatably fixed to the panel, and
        a handle protrusion being arranged on the backside surface of the elongated portion of the handle,
        an inside surface that, along with the backside surface, being finished with a mirror treatment; and
    at least one light source fixed at the panel for emitting light that is directed between the recessed portion and the handle, wherein
    the recessed portion and the reflection step of the panel and the backside surface of the handle having a structure and being oriented relative to one another for reflecting the light emitted from the light source to the inside surface of the handle and from the inside surface of the handle to the recessed portion of the door handle when the light source is turned on and the handle is in a closed position, and
    the handle protrusion being located adjacent to portion of the handle that is hinged to the panel and cooperating with and rotating relative to the panel protrusion for forming a light shield that prevents the light emitted by the light source from being emitted from an area between the recessed portion and an upper portion of the handle.

7. An exterior handle configuration according to claim 6, wherein the inside surface of the handle is also finished with a diffusion agent.

8. An exterior handle configuration according to claim 6, wherein the recessed portion includes a through hole behind the handle, and the light source is fixed behind the through hole.

9. An exterior handle configuration according to claim 6, wherein a surface of the recessed portion is finished with a diffusion treatment for diffusing light reflected from the inside surface of the handle and from the light source.

10. An exterior handle configuration according to claim 6, wherein the reflecting step is horizontally oriented along the recessed portion so as to divide the recessed portion into upper and lower portions, the step decreasing in thickness as it tapers away to the lower portion of the recessed portion.

11. An exterior handle configuration according to claim 6, wherein the reflecting surface is also finished with a diffusion treatment.

12. An exterior handle configuration according to claim 6, further comprising:
    a light source shield plate separate from and located behind the handle and configured to be slid by a slide mechanism to block the light emitted from the light source in response to the handle being rotated outwardly.

13. An exterior handle configuration according to claim 6, wherein the light source is at least one light emitting diode (LED).

14. An exterior handle configuration according to claim 6, wherein the backside surface of the handle is oriented to reflect light emitted from the light source to the reflection step, which in turn is oriented to reflect the light to the inside surface of the handle when the handle is in a closed position.

15. An exterior handle configuration according to claim 6, wherein the handle protrusion extends lengthwise along substantially an entire length of the backside surface of the elongated portion of the handle.

16. The exterior vehicle handle configuration according to claim 6, wherein the recessed portion and the reflection step of the panel and the backside surface of the handle have a structure and are oriented relative to one another for enabling the light emitted from the light source to be emitted downwardly without being reflected to the inside surface of the handle when the handle is in an outwardly rotated position.

17. The exterior vehicle handle configuration according to claim 16, wherein the light source is for emitting the light downwardly toward just above a lower end of the recess portion when the handle is in the outwardly rotated position.

18. A vehicle panel configuration, comprising:

a handle including a recessed elongated portion and a handle protrusion located at an upper hinged portion of the elongated portion of the handle;

a panel including a recessed portion, wherein respective surfaces of the recessed portion of the panel and the recessed elongated portion of the handle are substantially parallel to one another when the handle is in a closed position and form a channel extending therebetween, the recessed portion further including a through hole located on an upper side of the channel, through which light is emitted for illuminating the handle, and a panel protrusion arranged on an upper end of the upper portion of the recessed portion of the panel; the handle protrusion cooperating with and rotating relative to the panel protrusion to form a light shield for blocking the light along the channel;

a step that is horizontally oriented on the recessed portion so as to divide the recessed portion into an upper portion and a lower portion, the step decreasing in thickness as it tapers away to the lower portion of the recessed portion; and a mirror coated reflecting surface formed on the step and on the upper portion of the recessed portion for reflecting the light emitted from the through hole to the handle when the handle is in the closed position.

19. A vehicle panel configuration according to claim 18, wherein a surface of the lower portion of the recessed portion is finished with a diffusion treatment for diffusing light from the light source.

20. A vehicle panel configuration according to claim 18, wherein the reflecting surface is also finished with a diffusion treatment.

21. A vehicle panel configuration according to claim 18, wherein the channel is configured, when the handle is in a closed position, to direct the light toward the reflection step, the reflection step is configured to direct the light toward the inside surface of the handle, and the inside surface of the handle is configured to direct the light toward the lower portion of the recessed portion.

22. A vehicle panel configuration according to claim 18, wherein the handle protrusion extends lengthwise along substantially an entire length of a backside surface of the recessed elongated portion of the handle.

* * * * *